H. HAUCK & H. VOEGELE.
Filters.
No. 158,076. Patented Dec. 22, 1874.
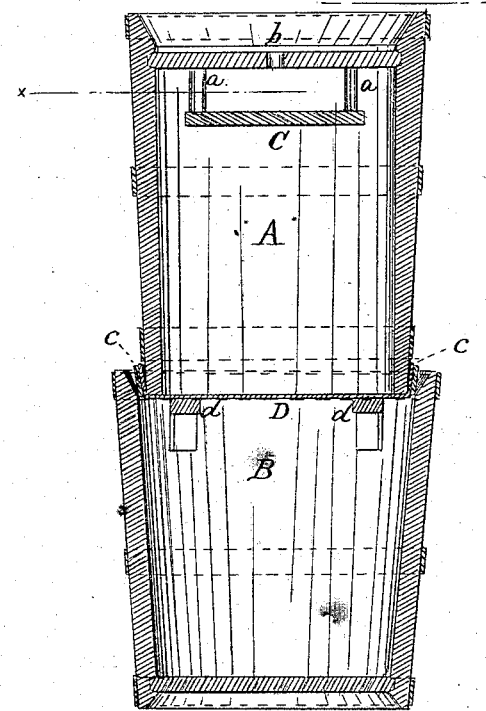
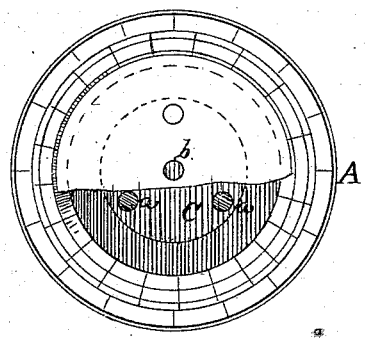
Witnesses
R. S. Lacey
John T. Downs
Inventors
Henry Hauck & Henry Voegele
By their Att'y G. B. Towles

UNITED STATES PATENT OFFICE.

HENRY HAUCK AND HENRY VOEGELE, OF MANSFIELD, OHIO.

IMPROVEMENT IN FILTERS.

Specification forming part of Letters Patent No. 158,076, dated December 22, 1874; application filed October 31, 1874.

*To all whom it may concern:*

Be it known that we, HENRY HAUCK and HENRY VOEGELE, of Mansfield, in the county of Richland, and State of Ohio, have invented certain new and useful Improvements in Filters; and we do hereby declare that the following is a full, clear, and exact description thereof, which will enable others skilled in the art to which it pertains to make and use the same, reference being had to the accompanying drawings, and to the letters of reference marked thereon, which form a part of this specification:

Figure 1 is a vertical section of our improved filter; Fig. 2 is a cross-section, showing distributing-plate.

Like letters in both figures of the drawing indicate like parts.

The nature of our invention consists in the combination of a distributing-plate placed on the inside of a filtering-vessel, with a flannel strainer or filter having its surface coated with two or three inches' thickness of paper-pulp, as may be required, so that cider or other liquid will be filtered perfectly free from dirt and other foreign substances; the said plate arresting the descent of the fluid before it reaches the flannel, in such a manner as to prevent its agitating the paper-pulp thereon, as will be hereinafter more fully explained.

A is the filtering-vessel, B the receiver, and C the distributing-plate, which is placed on the inside of the filtering-vessel at a suitable distance below the head thereof, for the purpose required, and suspended therefrom by means of the arms $a$. The head has a hole, $b$, in the center of it, directly over the center of the plate, to receive the liquid. The filter consists of a piece of flannel, D, stretched tightly over the bottom of the vessel, and secured thereto by pressing the rim or hoop $c$ over the edge thereof onto the flannel. The surface of the flannel is covered with paper-pulp from two to three inches in thickness, as may be required, to accomplish the filtering perfectly. The pulp is made by soaking white printing-paper in water until it becomes soft, when it is made like a thin paste by stirring it. It is then poured into the filtering-vessel from the top, and passing over the distributing-plate lodges upon the flannel below, where it is allowed to remain until all the fluid portion of the pulp passes through the flannel, thus leaving the surface thereof covered with a perfect even thickness of paper-pulp. The filtering-vessel tapers from the top to the bottom so as to permit the bottom to fit on the inside of the receiver, and rest upon the cross-bars $d$ attached thereto. The cider or other liquid to be filtered is poured into the hole $b$ through a funnel, and striking upon the plate flows off from all around the edge thereof, and distributes itself evenly and with such slight force upon the paper-pulp covering on the flannel below as not to agitate it, thus filtering the cider perfectly free from all dirt and other foreign substances.

Having thus fully described our invention, what we claim therein as new, and desire to secure by Letters Patent, is—

1. The filtering-vessel provided with the distributing-plate C, and head having hole $b$ to receive the liquid, in combination with a filter and a receiver, B, substantially as set forth.

2. The flannel strainer or filter D, having its surface covered with paper-pulp, in combination with distributing-plate C of the filtering-vessel A, and receiver B, substantially as and for the purpose set forth.

In testimony that we claim the foregoing as our own invention, we affix our signatures in presence of two witnesses.

HENRY HAUCK,
HENRY VOEGELE.

Witnesses:
H. K. PARSONS.
UEL. R. PARSONS.